United States Patent
Hsu

(10) Patent No.: US 8,391,200 B2
(45) Date of Patent: Mar. 5, 2013

(54) METHOD OF MULTIMEDIA BROADCAST MULTICAST SERVICE CONTENT AWARE SCHEDULING AND RECEIVING IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 312 days.

(21) Appl. No.: 12/846,845

(22) Filed: Jul. 30, 2010

(65) Prior Publication Data

US 2011/0026522 A1 Feb. 3, 2011

Related U.S. Application Data

(60) Provisional application No. 61/229,721, filed on Jul. 30, 2009.

(51) Int. Cl.
H04H 20/71 (2008.01)
(52) U.S. Cl. ........................................ 370/312; 370/390
(58) Field of Classification Search .................. 370/390, 370/312
See application file for complete search history.

(56) References Cited

U.S. PATENT DOCUMENTS

| | | | |
|---|---|---|---|
| 2009/0222855 A1* | 9/2009 | Vare et al. | 725/39 |
| 2009/0309868 A1* | 12/2009 | Jung et al. | 345/214 |
| 2010/0113056 A1 | 5/2010 | Chen | |
| 2010/0113057 A1* | 5/2010 | Englund et al. | 455/452.1 |

FOREIGN PATENT DOCUMENTS

| CN | 101272518 A | 9/2008 |
|---|---|---|
| WO | 2009054766 A1 | 4/2009 |

OTHER PUBLICATIONS

HTC Corporation: "Supporting multi-resolution streaming in MBMS", 3GPP TSG-RAN WG2 #67, R2-094765, Aug. 24-28, 2009, pp. 1-5, XP050352799, Shenzhen, China..
3rd Generation Partnership Project; Technical Specification Group Services and System Aspects; Improved Video Support for PSS and MBMS Services (Release 9), pp. 1-13, 3GPP TR 26.9de V0.0.2 (Jun. 2009), XP050356827, Sophia Antipolis Valbonne—France.
Alcatel-Lucent Shanghai Bell et al: "MAC PDU design for eMBMS scheduling", 3GPP TSG-RAN WG2 #66, R2-093093, May 4-8, 2009, pp. 1-4, XP050340837, San Francisco, US.
3rd Generation Partnership Project; Technical Specification Group Radio Access Network; Evolved Universal Terrestrial Radio Access (E-UTRA); Medium Access Control (MAC) protocol specification (Release 8) v8.6.0, Jun. 2009.
3rd Generation Partnership Project; Technical Specification Group Radio Access Network; Evolved Universal Terrestrial Radio Access (E-UTRA); Radio Resource Control (RRC) Protocol specification (Release 8) v8.6.0, Jun. 2009.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) v9.0.0, Jun. 2009.
Office Action mailed on Aug. 3, 2012 for the China application No. 201010246599.9, filing date Jul. 30, 2010, p. 1-6.

* cited by examiner

Primary Examiner — Sai-Ming Chan
(74) Attorney, Agent, or Firm — Winston Hsu; Scott Margo

(57) ABSTRACT

A method of MBMS content aware scheduling and receiving for a network of a wireless communication system includes receiving data of different resolutions generated from a data source from an MBMS content provider, wherein the received data is used for forming a plurality of MBMS services of different resolution levels, transmitting a plurality of dynamic scheduling information units corresponding to the plurality of MBMS services of different resolution levels formed with the received data except the MBMS service of the lowest resolution level, transmitting scheduling information of the MBMS services of the lowest resolution level on a multicast control channel, and transmitting the plurality of MBMS services of different resolution levels on a multicast traffic channel.

6 Claims, 6 Drawing Sheets

METHOD OF MULTIMEDIA BROADCAST MULTICAST SERVICE CONTENT AWARE SCHEDULING AND RECEIVING IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/229,721, filed on Jul. 30, 2009 and entitled "METHOD AND APPARATUS FOR MCCH and dynamic scheduling information of Content Aware Scheduling IN A WIRELESS COMMUNICATIONS SYSTEM", the contents of which are incorporated herein.

BACKGROUND OF THE INVENTION

1. Field of the Invention

The present invention relates to a method of multimedia broadcast multicast service (MBMS) content aware scheduling and receiving in a wireless communication system and related communication device, and more particularly, to a method for scheduling MBMS services of different resolution levels and for receiving an MBMS service according to requirements on the resolution level when performing the MBMS service and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The LTE radio protocol stack includes the Layer 3, also known as the Radio Resource Control (RRC) layer, the Layer 2, consisting of three sublayers that are the Packet Data Convergence Protocol (PDCP) layer, the Radio Link Control (RLC) layer, and the Medium Access Control (MAC) layer, and the Layer 1, also known as the Physical (PHY) layer.

Recently, the 3GPP is involved in the further advancements for E-UTRA and proposes an LTE-Advanced system as an enhancement of the LTE system. Carrier aggregation, where two or more component carriers are aggregated, is introduced into the LTE-Advanced system in order to support wider transmission bandwidths, e.g. up to 100 MHz and for spectrum aggregation. A UE of the LTE-Advanced system can simultaneously receive and/or transmit on multiple component carriers. Carrier aggregation allows a UE to aggregate a different number of component carriers of possibly different bandwidths in uplink and downlink.

Evolved multimedia broadcast multicast service (E-MBMS) has been introduced in the LTE specification to broadcast or multicast TV, films, information such as free overnight transmission of newspaper in a digital form. Two important scenarios have identified for the E-MBMS: one is single-cell broadcast, and the other is E-MBMS over a single frequency network (MBSFN). The MBSFN is a simulcast transmission technique that realizes transmission of identical waveforms at the same time from multiple cells covering a geographic area called an MBSFN area. A UE therefore observes multiple versions of the signal with different delays due to the multi-cell transmission. Since the MBSFN transmissions from the multiple cells are closely time-synchronized, the MBSFN transmission arrived at the UE is regarded as a transmission from a single cell and the UE may treat the MBSFN transmission in the same way as multi-path components of a single cell transmission without additional complexity. The MBSFN transmission takes place on dedicated subframes referred to as MBSFN subframes, which may also be used for non-MBMS data transmission when the MBSFN subframes are not allocated for MBMS data.

Please refer to FIG. 1, which is a diagram of E-MBMS architecture according to the prior art. A broadcast/multicast service center (BMSC) receives MBMS data generated from an MBMS content provider. An MBMS gateway is present between the BMSC and eNBs for delivering MBMS data to each eNB providing the MBMS service. A multicast coordination entity (MCE) is present between a mobility management entity (MME) and eNBs for allocating radio resources used by all eNBs in the MBSFN area for multi-cell MBMS transmission. The MCE may be a part of an eNB or another network element than E-UTRAN. To realize E-MBMS, the PHY layer of the LTE system offers information transfer services between a physical multicast channel (PMCH) and a downlink transport channel called multicast channel (MCH). The MCH is required to be broadcasted in the entire coverage area of each cell in the MBSFN area. Scheduling of each MCH is done by the MCE. The MAC layer of the LTE system offers data transfer services between the MCH and logical channels including a multicast traffic channel (MTCH) and a multicast control channel (MCCH), which are point-to-multipoint channels for transmitting traffic data and control information. Within MBSFN subframes, the transmission of a specific MCH carrying MTCH occupies a pattern of subframes which are not necessarily adjacent in time, called MCH subframe allocation pattern (MSAP). The MSAP for every MCH is signalled on the MCCH. The MSAP occasion comprises a set of subframes defined by the MSAP during a certain period.

A UE determines what subframes are used by each MTCH according to a dynamic scheduling information (DSI), which is generated by the eNB and allocated in the first subframe of the MSAP occasion, for indicating subframes used by each MTCH in the MSAP occasion. The DSI can be carried in an MAC control element or in a separate logical channel, such as a multicast scheduling channel (MSCH). Up to now, in 3GPP meetings, information that shall be included in the DSI is still under discussion.

The latest trend of mobile communication devices shows an increasing demand of smartphones, netbooks, or mobile internet devices, which are more diversified than ordinary mobile phones and enable advanced computing ability to implement a video compression standard such as H.264 or MPEG-4 commonly used for a video streaming service. That video compression standard is also foreseen to be used by E-MBMS. In the field of video compression, a video frame is compressed using different algorithms that are also called frame types, such as intra-frame (I-frame) or predicted frame (P-frame). An I-frame is the least compressible but does not require other video frames to decode, such as a conventional static image file. A P-frame, also known as a delta-frame, holds only the changes in the image from the previous frame and can use data from previous frames to decompress, which is more compressible than an I-frame. I-frames can be regarded as low-resolution data to present the least necessary information of a video, and P-frames can be regarded as high-resolution data to bring more detailed information. For an MBMS service as a video streaming service, an MBMS service of a high resolution level may include I-frames and P-frames to present the detail and an MBMS service of a low resolution level may include I-frames only. What resolution level an MBMS service is in depends on the number of resolutions the MBMS data (such as video frames) of the MBMS service have.

Note that, mobile communication devices having different screen sizes may have different requirements with respect to the resolution level when performing MBMS services. For example, a laptop computer is supposed to use a resolution level higher than that a smartphone uses for MBMS services. In addition, for a mobile communication device, a user may have different requirements on the same MBMS service at different time. For example, after the user shrinks the window size of a streaming video, the required resolution level of the video can be lowered. The user may use a picture-in-picture function when watching two or more videos in which one on the full screen requires a higher resolution level and the other in an inset window only requires a lower resolution level. In addition, the user may switch an active window of an MBMS service to another application window and puts the MBMS service window to the background, then only minimum resolution level is required or the mobile communication device stops receiving MBMS data until the user switches back to the MBMS service window.

However, the eNB has no way to know the screen size of each UE or how the user watches the MBMS service currently, and can only schedule an MBMS service including data having all levels of resolution to all UEs receiving the MBMS service. Each UE receives and decodes the same MBMS data, and thereby parts of MBMS data of required resolutions are recognized. If a UE requires only low-resolution MBMS data to be displayed, high-resolution MBMS data already decoded are discarded or unused and power consumption for receiving and processing these high-resolution MBMS data is wasted, which is a critical issue for UEs using batteries as a power source.

SUMMARY OF THE INVENTION

The present invention therefore provides a method of MBMS content aware scheduling and receiving in a wireless communication system.

According to one embodiment of the present invention, a method of MBMS content aware scheduling and receiving for a network of a wireless communication system includes receiving data of different resolutions generated from a data source from an MBMS content provider, wherein the received data is used for forming a plurality of MBMS services of different resolution levels, transmitting a plurality of DSI units corresponding to the plurality of MBMS services of different resolution levels formed with the received data except an MBMS service of the lowest resolution level, transmitting scheduling information of the MBMS service of the lowest resolution level on a multicast control channel, and transmitting the plurality of MBMS services of different resolution levels on a multicast traffic channel.

According to another embodiment of the present invention, a method of MBMS content aware scheduling and receiving for a UE of a wireless communication system includes selecting a resolution level for performing an MBMS service according to a presented picture size of the MBMS service on a screen of the UE, receiving a plurality of DSI units and scheduling information on a MCCH from a network of the wireless communication system, wherein the MCCH indicates subframes for an MBMS service of the lowest resolution level of a plurality of MBMS services of different resolution levels and the plurality of DSI units indicate subframes for the plurality of MBMS services of different resolution levels except the MBMS service of the lowest resolution level, and receiving the MBMS service of the selected resolution level on a MTCH according to scheduling information on the MCCH and at least one DSI unit corresponding to the MBMS service of the selected resolution level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
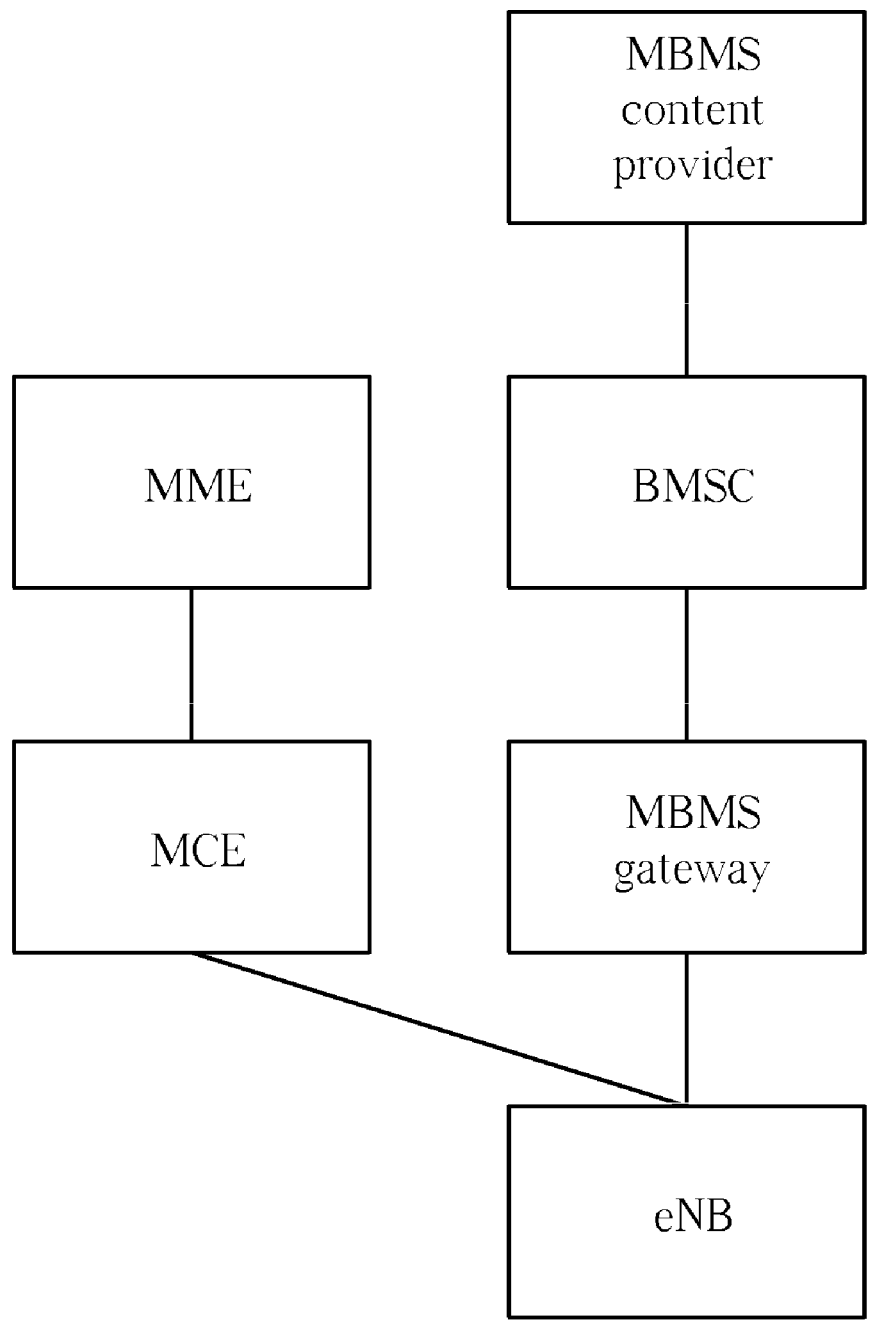
FIG. 1 is a diagram of E-MBMS architecture according to the prior art.
Figure 2:
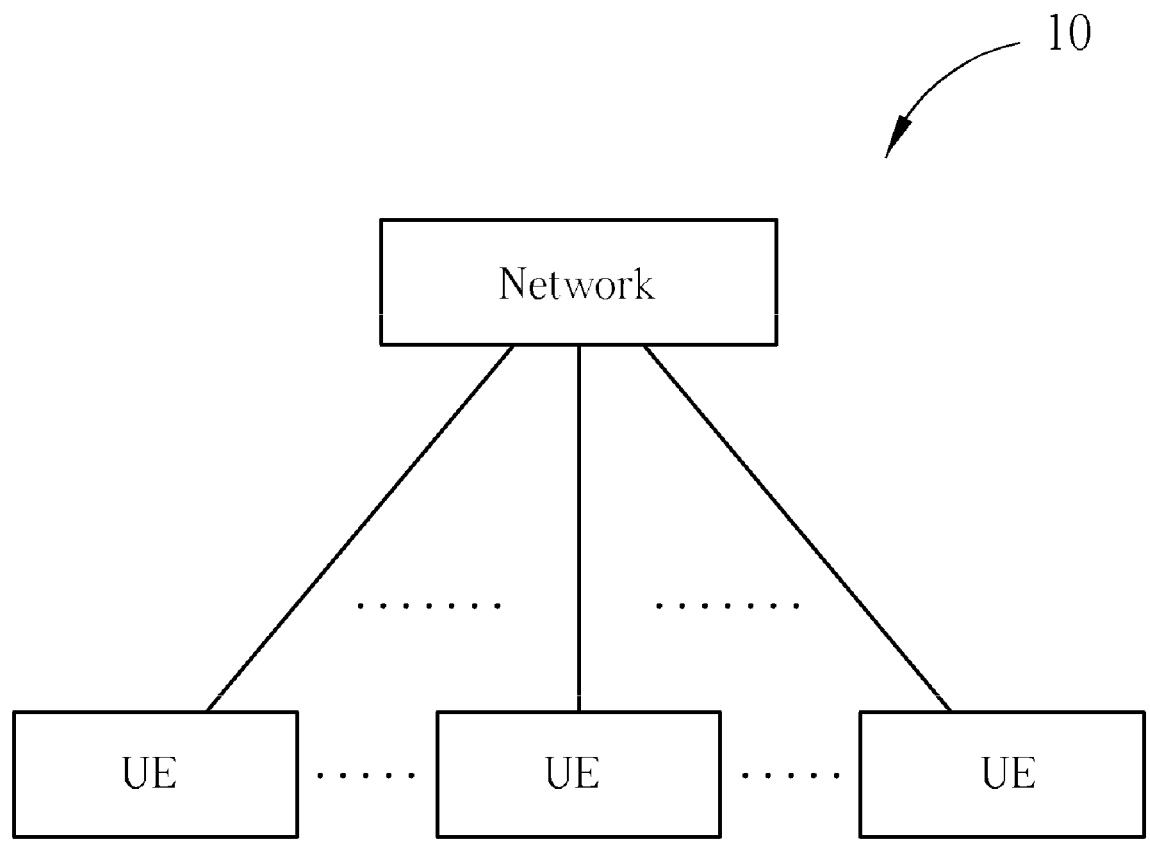
FIG. 2 is a schematic diagram of an exemplary wireless communication system.

Please refer to FIG. 2, which illustrates a schematic diagram of an examplary wireless communication system 10. Briefly, the wireless communication system 10 is composed of a network and a plurality of mobile devices. The wireless communication system 10 can be a LTE system, a LTE-advanced system, or any other similar network system supporting evolved multimedia broadcast multicast service (E-MBMS). In the LTE or LTE-Advanced system, the network can be referred as an E-UTRAN comprising a plurality of eNBs, and the mobile devices are referred as UEs. Each eNB is able to communicate with an MBMS content provider to receive MBMS data. The UEs can be devices such as mobile phones, computer systems, etc. This terminology will be used throughout the application for ease of reference; however, this should not be construed as limiting the disclosure to any one particular type of network. In some examples, the network and the UE may be seen as a transmitter or receiver according to transmission direction, e.g. for uplink, the UE is the transmitter and the network is the receiver, and for downlink, the network is the transmitter and the UE is the receiver.

Figure 3:
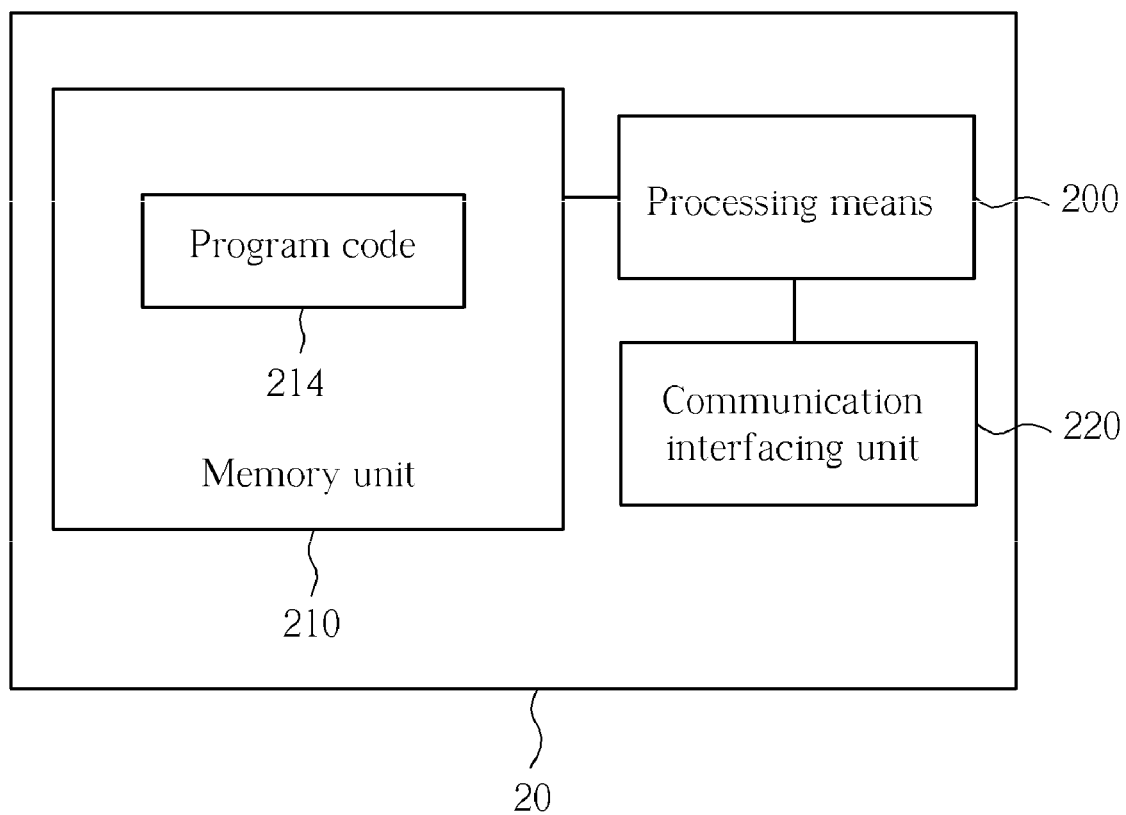
FIG. 3 is a schematic diagram of an exemplary communication device.

Please refer to FIG. 3, which is a schematic diagram of an exemplary communication device 20. The communication device 20 can be the network or the UE shown in FIG. 2 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), flash memory, random-access memory (RAM), CD-ROM, magnetic tape, floppy disk, and optical data storage device. The communication interfacing unit 220 is preferably a radio transceiver for wirelessly communicating according to processing results of the processing means 200.

Figure 4:
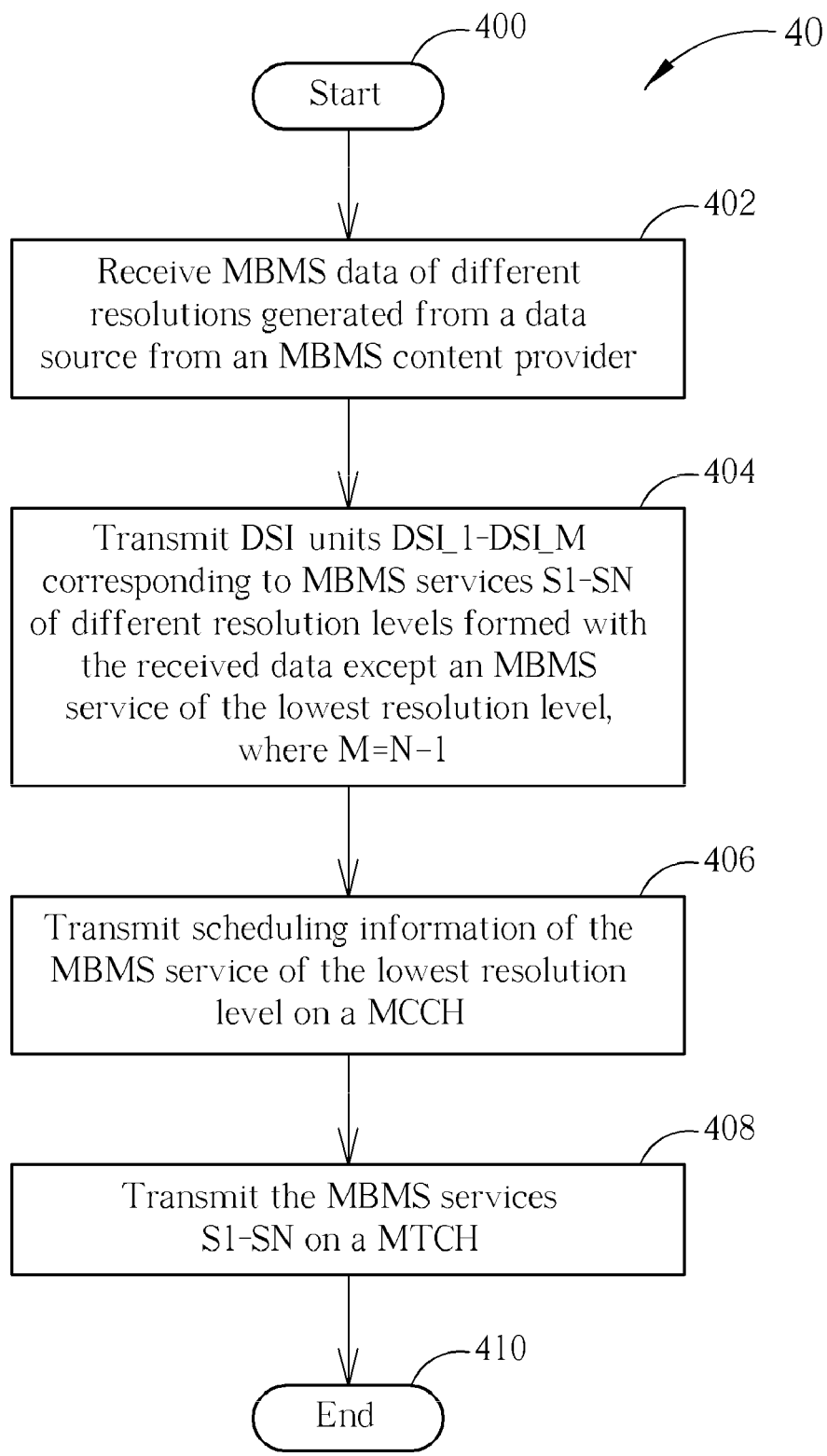
FIG. 4 is a flowchart of an exemplary process.

To improve efficiency of power consumption for the UE when MBMS services are performed, MBMS content aware scheduling and receiving are necessary for the eNB and the UE. Please refer to FIG. 4, which is a flowchart of an exemplary process 40. The process 40 is utilized for MBMS content aware scheduling and receiving for the network of the wireless communication system 10. The process 40 can be compiled into the program code 214. The process 40 includes the following steps:

Step 400: Start.

Step 402: Receive MBMS data of different resolutions generated from a data source from an MBMS content provider.

Step 404: Transmit dynamic scheduling information (DSI) units DSI_1-DSI_M corresponding to MBMS services S1-SN of different resolution levels formed with the received data except an MBMS service of the lowest resolution level, where M=N−1.

Step 406: Transmit scheduling information of the MBMS service of the lowest resolution level on a multicast control channel (MCCH).

Step 408: Transmit the MBMS services S1-SN on a multicast traffic channel (MTCH).

Step 410: End.

According to Step 402, the eNB receives MBMS data of different resolutions generated from a data source from an MBMS content provider, which are used for forming MBMS services S1-SN of different resolution levels that provides the same program to be played in N resolution levels. S1 denotes the MBMS service of the lowest resolution level and SN denotes the MBMS service of the highest resolution level. The number of resolutions the received MBMS data have is determined by the MBMS content provider and not limited in the process 40. For example, when the received MBMS data have two resolutions, the received MBMS data includes low-resolution MBMS data, e.g. I-frames compressed from a video and high-resolution MBMS data, e.g. P-frames compressed from the same video; the MBMS service of a high resolution level is formed with the low-resolution MBMS data and the high-resolution MBMS data; the MBMS service of a low resolution level is formed with the low-resolution MBMS data only.

After receiving MBMS data, according to Step 404 and Step 406, the eNB transmits (or said broadcasts) DSI units DSI_1-DSI_M and transmits scheduling information of the MBMS service S1 of the lowest resolution level on the MCCH to the UE, before the MTCH is transmitted. Each of the DSI units DSI_1-DSI_M is utilized for indicating subframes with respect to a corresponding one of the MBMS services S1-SN except the MBMS service S1, that is, the MBMS services S2-SN, where M=N−1. After the DSI units DSI_1-DSI_M and the scheduling information of the MBMS service S1 are transmitted, according to Step 408, the eNB transmits data of MBMS services S1-SN on a MTCH. That is, all the MBMS services of different resolution levels are transmitted on the same MTCH.

Figure 5:
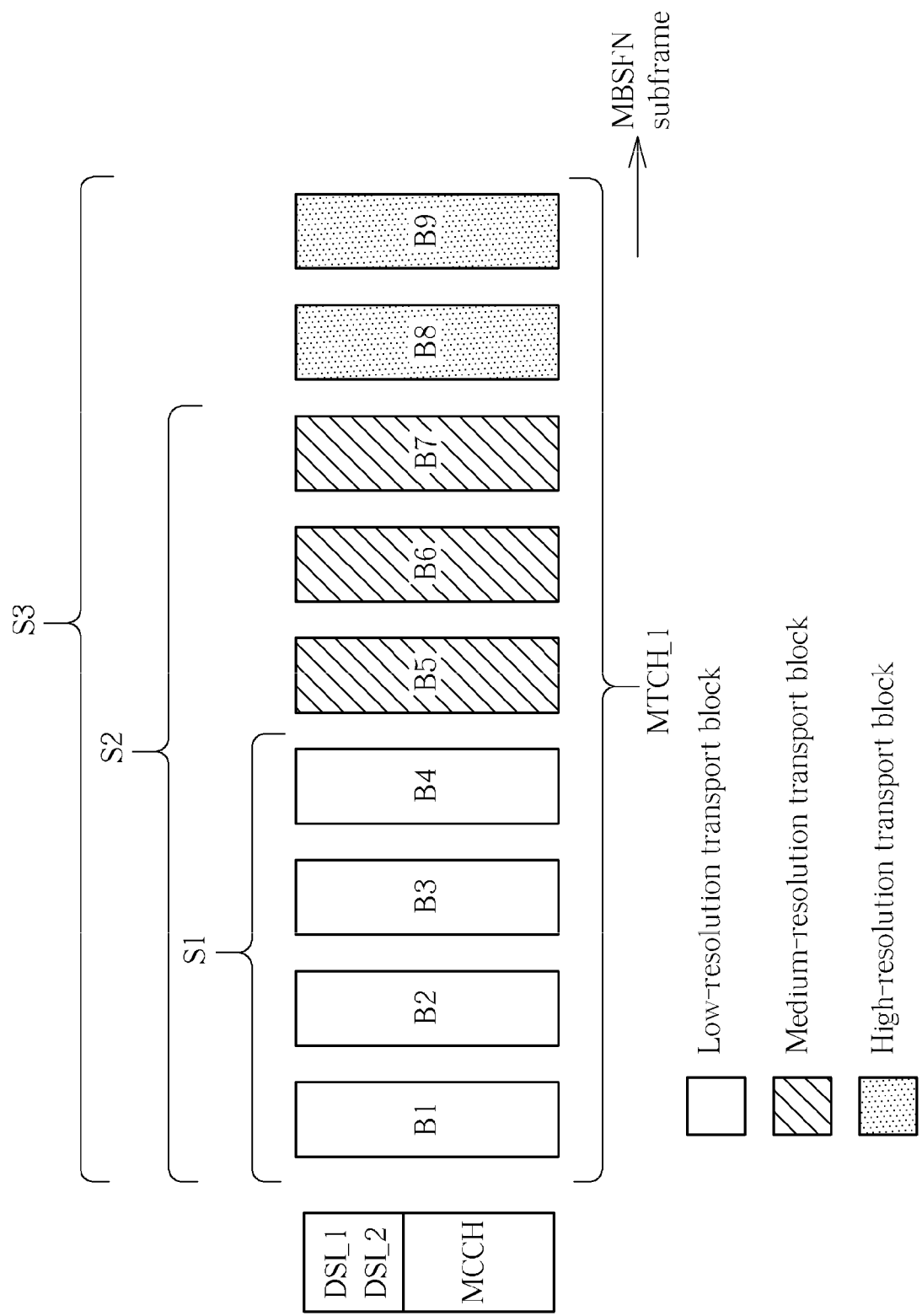
FIG. 5 is a diagram of MBSFN resource allocation according to the process of FIG. 4.

Please refer to FIG. 5, which is a diagram of MBSFN (E-MBMS over a single frequency network) resource allocation according to the process 40. In FIG. 5, transport blocks B1-B9 generated from the received MBMS data, including low-resolution transport blocks B1-B4, medium-resolution transport blocks B5-B7 and high-resolution transport blocks B8 and B9, are on the same multicast traffic channel MTCH_1. The MBMS service S1 of the lowest resolution level includes the transport blocks B1-B4; the MBMS service S2 of the medium resolution level includes the transport blocks B1-B7; the MBMS service S3 of the highest resolution level includes the transport blocks B1-B9. The first subframe before MTCH_1 is used for the MCCH indicating subframes for the low-resolution transport blocks B1-B4 of the MBMS service S1, and the first subframe is also used for two DSI units DSI_1 and DSI_2 corresponding to MBMS services S2 and S3.

Note that, the eNB may provide scheduling information of the MBMS services other than the MBMS service of the lowest resolution level in the DSI units by different ways. In one example, the eNB assigns a DSI unit corresponding to an MBMS service of a first resolution level (other than the lowest resolution level) to indicate only extra subframes additionally required for the MBMS service of the first resolution level as compared with an MBMS service of a second resolution level next lower than the first resolution level, or in another example, to indicate only extra subframes additionally required for the MBMS service of the first resolution level as compared with the MBMS service of the lowest resolution level. In other words, the eNB assigns a DSI unit corresponding to an MBMS service of a certain resolution level to indicate a difference of subframes between the MBMS service of the certain resolution level and the MBMS service of a next lower resolution level, or indicate a difference of subframes between the MBMS service of the certain resolution level and the MBMS service of the lowest resolution level.

As in FIG. 5, for the case of a DSI unit indicating difference of subframes between two MBMS services having adjacent resolution levels, the DSI unit DSI_1 indicates subframes corresponding to the medium-resolution transport blocks B5-B7, and the DSI unit DSI_2 indicates subframes corresponding to the high-resolution transport blocks B8 and B9. Therefore, the UE can receive the MBMS service S1 (including B1-B4) only according to scheduling information on the MCCH, or receive the MBMS service S2 (including B1-B7) according to scheduling information on the MCCH and the DSI unit DSI_1, or receive the MBMS service S3 (including B1-B9) according to scheduling information on the MCCH and the DSI units DSI_1 and DSI_2.

In addition, for the case of a DSI unit indicating difference of subframes between a MBMS service of a certain resolution level and the MBMS service of the lowest resolution level, the DSI unit DSI_1 indicates subframes corresponding to the medium-resolution transport blocks B5-B7, and the DSI unit DSI_2 indicates subframes corresponding to the medium-resolution and high-resolution transport blocks B5-B9. From the eNB using this kind of DSI unit, the UE can receive the MBMS service S3 according to scheduling information on the MCCH and the DSI unit DSI_2 (without DSI_1).

In the prior art, the eNB broadcasts an MBMS service including MBMS data of all levels of resolution and a UE receives this MBMS service regardless of the screen size of the UE or how a user watches the MBMS service on the UE, which results in inefficient power consumption. In comparison, from the eNB using the process 40, the UE can receive the MBMS service of a selected resolution level including only required MBMS data according to scheduling information on the MCCH and/or at least one DSI units, and thereby efficiency of power consumption of the UE is improved.

Figure 6:
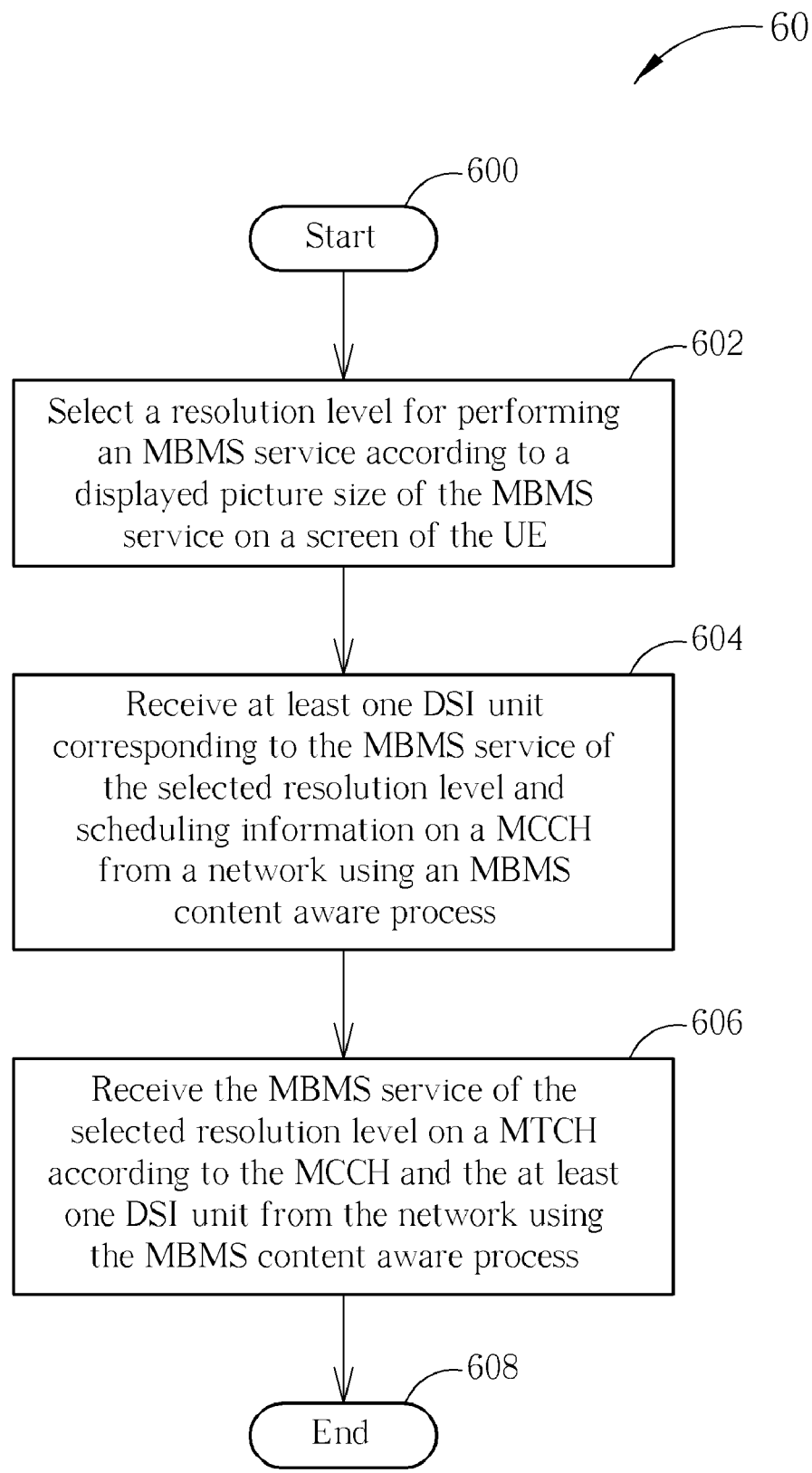
FIG. 6 is a flowchart of an exemplary process.

Please refer to FIG. 6, which is a flowchart of an exemplary process 60. The process 60 is utilized for MBMS content aware scheduling and receiving for a UE of the wireless communication system 10. The process 60 can be compiled into the program code 214. The process 60 includes the following steps:

Step 600: Start.

Step 602: Select a resolution level for performing an MBMS service according to a displayed picture size of the MBMS service on a screen of the UE.

Step 604: Receive at least one DSI unit corresponding to the MBMS service of the selected resolution level and scheduling information on a MCCH from a network using an MBMS content aware process.

Step 606: Receive the MBMS service of the selected resolution level on a MTCH according to scheduling information on the MCCH and the at least one DSI unit from the network using the MBMS content aware process.

Step 608: End.

The UE using the process 60 cooperates with the eNB using the process 40. According to Step 602, the UE selects a resolution level for performing an MBMS service according to the actual displayed picture size of the MBMS service, such as the screen size of the UE, the size of an inset window, or even no displayed picture (when the MBMS service window is put in the background), which depends on the how the user uses the UE. Note that when the UE selects a resolution level and finds that is not provided by the MBMS services from the eNB, the UE selects a closest resolution level provided by the MBMS services.

According to Step 604, the UE receives at least one DSI unit corresponding to the MBMS service of the selected resolution level and receives scheduling information on the MCCH from the eNB using the process 40 as an MBMS content aware process. Known from the process 40, scheduling information on the MCCH indicates subframes for the MBMS service of the lowest resolution level and each DSI unit indicates subframes additionally required for the MBMS service of the selected resolution level as compared with an MBMS service of a next lower resolution level or the MBMS service of the lowest resolution level. Which DSI unit is received is determined by the UE according to the selected resolution level of the MBMS service. After the Step 604 of receiving at least one DSI unit and the scheduling information on the MCCH, according to Step 606, the UE receives the MBMS service of the selected resolution level on a MTCH according to the scheduling information on the MCCH and the at least one DSI unit from the eNB.

In the prior art, the eNB can only schedule the MBMS service including MBMS data of all levels of resolution and the UE has to receives and decodes the MBMS data of all levels of resolution more than the required resolutions the UE actually requires. In comparison, through the process 60, the UE selects a resolution level for the MBMS service, and then receives the MBMS service of the selected resolution level on only one MTCH according to the received DSI units and the scheduling information on the MCCH, so that power consumption of the UE is saved from receiving and processing MBMS data of unnecessary resolutions and MTCH resources are used in the most efficient way.

Please note that the abovementioned steps of the process 40 or 60 including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, through the exemplary processes, the eNB schedules the MBMS services of different resolution levels generated from the same data source, and the UE therefore receives the MBMS service of a resolution level that is necessary for the UE. Therefore, power consumption of the UE is reduced when performing MBMS service, which is especially beneficial for the UE using a battery as a power source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of multimedia broadcast multicast service (MBMS) content aware scheduling and receiving for a network of a wireless communication system, the method comprising:

receiving data of different resolutions generated from a data source from an MBMS content provider, wherein the received data is used for forming a plurality of MBMS services of different resolution levels;

transmitting a plurality of dynamic scheduling information (DSI) units corresponding to the plurality of MBMS services of different resolution levels formed with the received data except an MBMS service of the lowest resolution level;

transmitting scheduling information of the MBMS service of the lowest resolution level on a multicast control channel; and transmitting the plurality of MBMS services of different resolution levels on a multicast traffic channel.

2. The method of claim 1, wherein a first DSI unit of the plurality of DSI units indicates subframes additionally required for an MBMS service of a first resolution level as compared with an MBMS service of a second resolution level next lower than the first resolution level.

3. The method of claim 1, wherein a first DSI unit of the plurality of DSI units indicates subframes additionally required for an MBMS service of a first resolution level as compared with the MBMS service of the lowest resolution level.

4. A method of multimedia broadcast multicast service (MBMS) content aware scheduling and receiving for a user equipment of a wireless communication system, the method comprising:

selecting a resolution level for performing an MBMS service according to a presented picture size of the MBMS service on a screen of the user equipment;

receiving at least one dynamic scheduling information (DSI) unit and scheduling information on a multicast control channel from a network of the wireless communication system, wherein the multicast control channel indicates subframes for an MBMS service of the lowest resolution level of a plurality of MBMS services of different resolution levels and the at least one DSI unit indicates subframes for the plurality of MBMS services of different resolution levels except an MBMS service of the lowest resolution level; and receiving the MBMS service of the selected resolution level on a multicast traffic channel according to the scheduling information on the multicast control channel and at least one DSI unit corresponding to the MBMS service of the selected resolution level.

5. The method of claim 4, wherein the network configures a first DSI unit of the at least one DSI unit for indicating subframes additionally required for an MBMS service of a first resolution level as compared with an MBMS service of a second resolution level next lower than the first resolution level.

6. The method of claim 4, wherein the network configures a first DSI unit of the at least one DSI unit for indicating subframes additionally required for an MBMS service of a first resolution level as compared with the MBMS service of the lowest resolution level.

* * * * *